Patented Feb. 1, 1938

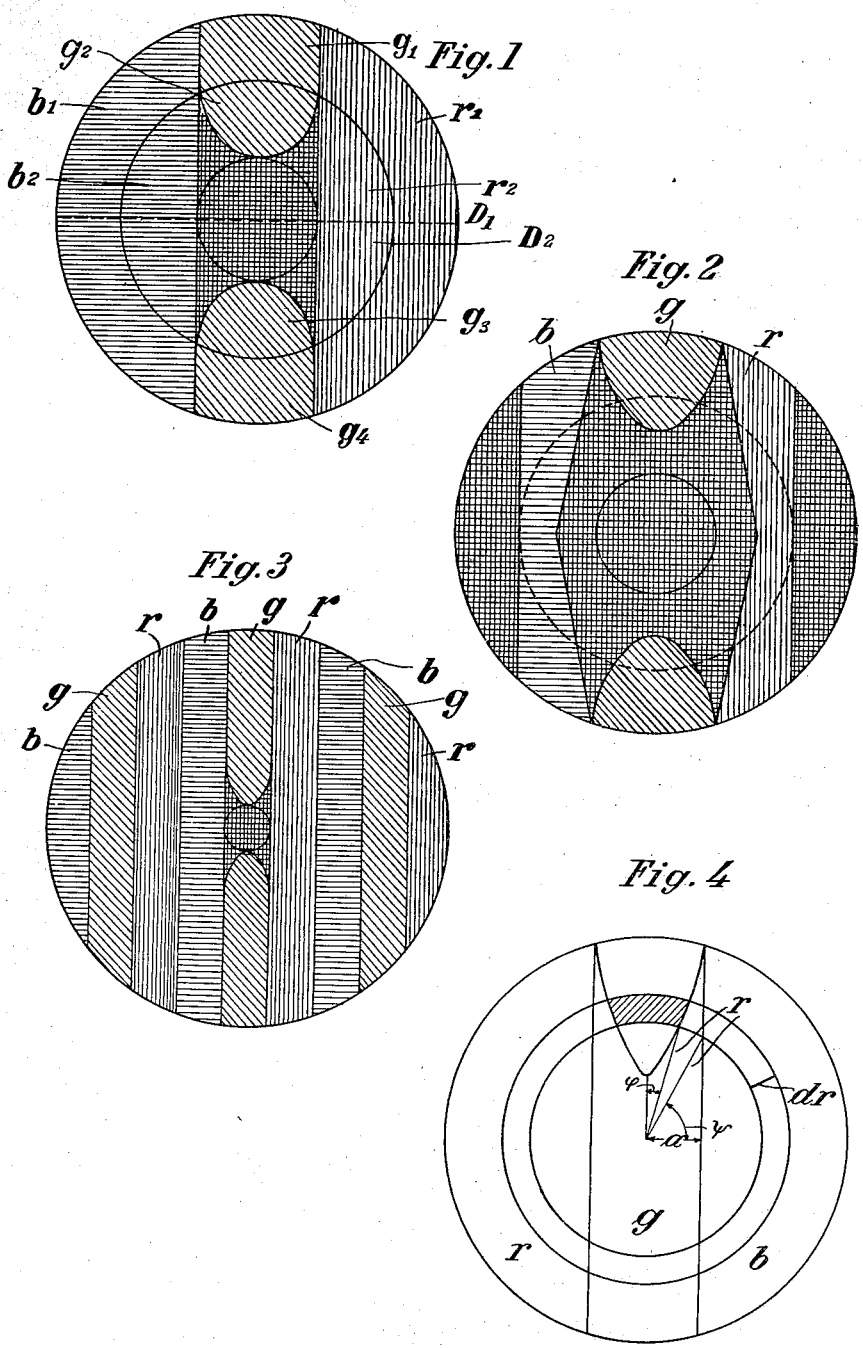

2,107,116

UNITED STATES PATENT OFFICE 2,107,116

MULTICOLOR FILTER

Gerd Heymer, Wolfen, Kreis Bitterfeld, Germany, assignor to Agfa Ansco Corporation, Binghamton, N. Y., a corporation of New York Application May 21, 1935, Serial No. 22,643
In Germany March 11, 1931

1 Claim. (Cl. 95—81.5)

My present invention relates to a multi-color filter and more particularly a multi-color filter capable of being obturated concentrically. It is a continuation in part of my co-pending application Ser. No. 597,601, filed March 8, 1932.

One of its objects is to provide a mask allowing the concentrical obturation. Further objects will be seen from the specification following hereafter. Reference is made to the accompanying drawing in which Figs. 1 and 4 represent a three-color filter provided with a mask allowing concentrically obturation;

Fig. 2 represents the same arrangement as Fig. 1, but the mask having a shape that in spite of the obturation the optical centre of gravity remains in the centre of the red and blue strips;

Fig. 3 shows a multi-color filter in which noteworthy differences in the proportion of the areas of each color occur only when the filter is obturated so that a three-color filter remains which bears a mask of the shape shown in Fig. 1, and Fig. 4 shows a three-color filter with a blue, a green and a red strip provided with a mask before the green filter strip of which the curves uniting the cut-outs have been determined mathematically.

In taking moving pictures in natural colors according to the known Berthon process a multi-color filter is used which consists of several parallel areas of different colors in the form of parallel strips. In this case the customary concentric reduction of the diaphragm aperture by means of circular or iris diaphragms cannot be applied, because as the step is increased the relative proportion of the areas of the color strips would be altered more and more in favor of the middle color strip, and it would therefore be impossible to obtain a picture in true colors.

The present invention provides a parallel band multi-color filter which is capable of being obturated concentrically, without leading to the production of colors which are not the true colors. For this purpose there is fitted either in front of or on the filter a mask having a form such that the relative proportion of the effective color areas on the filter will not be altered by concentric stopping, whatever be the size of the stop.

In the accompanying drawing Fig. 1 represents, by way of example, a mask of the kind above described fitted on the middle portion of the filter and having an outline of a determined shape.

When the diaphragm of the objective (diameter $D_1D_1$) is fully open, the effective blue area of the filter consists of the zones $b_1$ and $b_2$, the effective green area consists of the zones $g_1$, $g_2$, $g_3$, and $g_4$ and the effective red area consists of the zones $r_1$ and $r_2$.

When the objective has been obturated to the diameter $D_2D_2$,

The blue area consists of the zone $b_2$,
The green area consists of the zones $g_2$ and $g_3$,
The red area consists of the zone $r_2$.

The following equation must therefore be satisfied $$(b_1+b_2):(g_1+g_2+g_3+g_4):(r_1+r_2)=b_2:(g_2+g_3):r_2$$

The curves can be determined mathematically or empirically. When proceeding according to the empirical method, the outline of the multicolor filter, for instance, of a three-color filter is drawn on a paper ruled in millimeters. To the circular outline of the filter there are drawn concentric circles. Then the area of the middle filter strip between two adjacent concentric circles is subdivided symmetrically to the middle line of the middle filter strip so that the ratio of the sum of the partial areas of the middle filter strips and the partial areas of the lateral filter strips remains the same. By uniting the corresponding points of the partial areas of the middle filter strip there are formed two curves which give the outline of the mask which is to be placed on the middle filter strip so that in concentric stopping the ratio of the different colors remains always the same.

If in Fig. 4 $a$ designates half of the breadth of the middle filter strip, $r$ designates the distance of a point of the curve from the center of the filter, $\varphi$ designates the angle between the middle line of the green filter strip and $r$, and $\psi$ the angle between a point where one of the concentric circles to the outline of the filter cuts the border of the green filter area and the perpendicular to this border line through the center of the filter the following may be derived from Fig. 4:

The increase of green between two concentric circles amounts to $4\varphi r\, dr$, The increase of red or blue to $2\psi r\, dr$.

The increase of red and blue to $4\psi r\, dr$.

Inasmuch as the ratio between green on the one hand, and blue or red or the sum of red and blue on the other hand shall be constant and designated with $k$ the following equation is applicable:

$$\frac{\text{green}}{\text{red}+\text{blue}}=k=\frac{\varphi}{\psi}$$

$$\varphi=k\psi \quad \cos\psi=\frac{a}{r}$$

$$\psi=\arccos\frac{a}{r}$$

$$\varphi=k\cdot\arccos\frac{a}{r}$$

$$r=\frac{a}{\cos\frac{\varphi}{k}}$$

What I claim is:

A striped three-color filter for use with lenticular films of which the middle filter strip is provided with a removable mask having at the upper and the lower ends a cut-out of which the limiting curve is determined by the equations (1) $\quad \varphi=k\cdot\arccos\frac{a}{r}$ (2) $\quad r=\dfrac{a}{\cos\cdot\frac{\varphi}{k}}$ (3) $\quad \psi=\arccos\frac{a}{r}$ $k$ designating the ratio between the green and the sum of the red and blue filter areas, $a$ designating half of the breadth of the middle filter strip, $r$ designating the distance of a point of the curve from the center of the filter, $\varphi$ designating the angle between the middle line of a green filter strip and $r$, and $\psi$ designating the angle between a point where one of the concentric circles of the outline of the filter cuts the border of the green filter area and the perpendicular to this border line through the center of the filter.

GERD HEYMER.